United States Patent
Fujimoto et al.

(10) Patent No.: US 11,068,381 B2
(45) Date of Patent: Jul. 20, 2021

(54) PROGRAM ANALYSIS DEVICE, PROGRAM ANALYSIS SYSTEM, PROGRAM ANALYSIS METHOD AND COMPUTER READABLE MEDIUM

(71) Applicant: Mitsubishi Electric Corporation, Tokyo (JP)

(72) Inventors: Takanari Fujimoto, Tokyo (JP); Tadataka Asakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/469,761

(22) PCT Filed: Dec. 29, 2016

(86) PCT No.: PCT/JP2016/089210
§ 371 (c)(1),
(2) Date: Jun. 14, 2019

(87) PCT Pub. No.: WO2018/123065
PCT Pub. Date: Jul. 5, 2018

(65) Prior Publication Data
US 2020/0081821 A1   Mar. 12, 2020

(51) Int. Cl.
*G06F 11/36* (2006.01)
*G06F 11/32* (2006.01)

(52) U.S. Cl.
CPC ........ *G06F 11/3664* (2013.01); *G06F 11/327* (2013.01); *G06F 11/3604* (2013.01)

(58) Field of Classification Search
CPC . G06F 11/3664; G06F 11/327; G06F 11/3604
See application file for complete search history.

(56) References Cited

U.S. PATENT DOCUMENTS 9,747,190 B2 * 8/2017 Tojo .................... G06F 11/3636
9,983,976 B1 * 5/2018 Gonzalez ............ G06F 11/3604
(Continued)

FOREIGN PATENT DOCUMENTS

| JP | 2003177940 A | 6/2003 |
| JP | 2004171318 A | 6/2004 |

(Continued)

OTHER PUBLICATIONS

Zhi Da Luo et al., Effective Static Analysis to Find Concurrency Bugs In Java, IEEE, 2010, retrieved online on Mar. 27, 2021, pp. 135-144. Retrieved from the Internet: <URL: https://ieeexplore.ieee.org/stamp/stamp.jsp?tp=&arnumber=5601820>. (Year: 2010).*

(Continued)

*Primary Examiner* — Hanh Thi-Minh Bui
(74) *Attorney, Agent, or Firm* — Buchanan Ingersoll & Rooney PC

(57) ABSTRACT

In a program analysis system, a first execution device and a second execution device execute a first program and a second program concurrently while communicating with each other. Further, a program analysis device includes a collection unit to collect transmission information representing communication performed by the first execution device in accordance with a transmission function, and reception information representing communication performed by the second execution device in accordance with a reception function. Furthermore, the program analysis device includes an inspection unit to inspect whether a falsely-detected warning exists in warnings included in an analysis result obtained by analyzing each source code of the first program and the second program by an analysis tool.

8 Claims, 9 Drawing Sheets

(56) References Cited

U.S. PATENT DOCUMENTS

| | | | |
|---|---|---|---|
| 2003/0145125 A1* | 7/2003 | Horikawa | G06F 11/3636 719/318 |
| 2009/0125887 A1 | 5/2009 | Kahlon et al. | |
| 2009/0235233 A1 | 9/2009 | Suzuki et al. | |
| 2013/0152055 A1* | 6/2013 | Joshi | G06F 11/3604 717/131 |
| 2014/0244645 A1 | 8/2014 | Muske et al. | |
| 2015/0040108 A1 | 2/2015 | Kushida et al. | |
| 2018/0114026 A1* | 4/2018 | Wang | G06F 11/3604 |

FOREIGN PATENT DOCUMENTS

| | | |
|---|---|---|
| JP | 2007004365 A | 1/2007 |
| JP | 2009123216 A | 6/2009 |
| JP | 2009211424 A | 9/2009 |
| JP | 2011133966 A | 7/2011 |
| JP | 2012164211 A | 8/2012 |
| JP | 2014170530 A | 9/2014 |
| JP | 2015169997 A | 9/2015 |
| WO | 2006137223 A1 | 12/2006 |

OTHER PUBLICATIONS

International Search Report (with English translation) and Written Opinion issued in corresponding International Patent Application No. PCT/JP2016/089210, 6 pages (dated Mar. 21, 2017).

* cited by examiner

Fig. 8

(AAA.c) ANALYSIS RESULT:
...
(BBB.c) ANALYSIS RESULT:
(1) 6TH LINE: idx>4, AND REGION OTHER THAN SIZE OF a_abc ARRAY OF SIZE 4 MAY BE REFERRED TO.
(2) 7TH LINE: idx>8, AND REGION OTHER THAN SIZE OF a_def ARRAY OF SIZE 8 MAY BE REFERRED TO. ← 451: FALSELY-DETECTED WARNING
(3) ...

OCCURRENCE CONDITION OF WARNING 2 OF ANALYSIS RESULT: idx>8 IS NOT ACTUALLY MET; THEREFORE, WARNING 2 IS DEEMED TO BE FALSELY-DETECTED WARNING, NOT AS A PROBLEM, AND BECOMES REMOVAL OBJECT.

| 2016/09/30 15:00:01.001 | write_to_B | AAA.c | 3 | — | ... | unit_no | 2 | i | 7 |
| 2016/09/30 15:00:01.053 | read_from_A | BBB.c | 5 | idx | ... | unit_no | 2 | 7 | — |
| ... | ... | ... | ... | ... | ... | ... | ... | ... | ... |

PROGRAM ANALYSIS DEVICE, PROGRAM ANALYSIS SYSTEM, PROGRAM ANALYSIS METHOD AND COMPUTER READABLE MEDIUM

TECHNICAL FIELD

The present invention relates to a program analysis system, a program analysis device, a program analysis method and an analysis program.

BACKGROUND ART

Patent Literature 1 discloses a technique to reduce a review time of an analysis result by grouping warnings. Further, Patent Literature 2 discloses a technique to accurately estimate an execution time of a program group executed concurrently in a plurality of domains.

CITATION LIST

Patent Literature

Patent Literature 1: JP 2014-170530 A
Patent Literature 2: JP 2015-169997 A

SUMMARY OF INVENTION

Technical Problem

However, the technique disclosed in Patent Literature 1 takes a program group executed in one domain as an analysis object of static analysis. Therefore, when the static analysis is executed on a system wherein programs are executed concurrently by inter-domain communication, it may occur that information of the inter-domain communication is not considered, and warnings that cannot be generated in an actual operation, i.e., falsely-detected warnings are generated.

Further, according to the technique disclosed in Patent Literature 2, it is possible to obtain information on a behavior of the programs executed concurrently. However, information communicated between the programs executed concurrently is not considered at all. Therefore, it is impossible to obtain information on static analysis to clarify an internal problem commonly existing in source codes of the programs concurrently executed.

The present invention is aimed at obtaining a precise analysis result in consideration of an influence by communication, when a program group executed in domains different from each other is executed concurrently while performing an inter-domain communication.

Solution to Problem

A program analysis system according to one aspect of the present invention including a first execution device to execute a first program, a second execution device to execute a second program, and a program analysis device to analyze the first program and the second program, wherein the first program includes a transmission function to transmit a value to the second program, the second program includes a reception function to receive a value from the first program, and the first execution device and the second execution device execute the first program and the second program concurrently while communicating with each other, and wherein the program analysis device includes a collection unit to collect transmission information representing communication performed by the first execution device in accordance with the transmission function, and reception information representing communication performed by the second execution device in accordance with the reception function, and an inspection unit to inspect, by using the transmission information and the reception information collected by the collection unit, whether a falsely-detected warning exists in a warning included in an analysis result obtained by analyzing each source code of the first program and the second program by an analysis tool.

Advantageous Effects of Invention

In a program analysis system according to the present invention, a first program and a second program are executed concurrently while a first execution device and a second execution device communicate with each other. Further, a program analysis device is equipped with a collection unit to collect transmission information representing communication performed by the first execution device according to a transmission function, and reception information representing communication performed by the second execution device according to a reception function. Furthermore, the program analysis device is equipped with an inspection unit to inspect whether a warning falsely detected exists in warnings included in an analysis result obtained by analyzing source cords respectively of the first program and the second program by using the transmission information and the reception information. Therefore, by the program analysis system according to the present invention, it is possible to obtain an accurate analysis result in consideration of an influence by communication since it is possible to inspect whether a warning falsely detected due to the influence by communication exists in the warnings included in the analysis result.

BRIEF DESCRIPTION OF DRAWINGS

FIG. 8 is a diagram illustrating a concrete example of the inspection process S20 according to the first embodiment.

DESCRIPTION OF EMBODIMENTS

Figure 1:
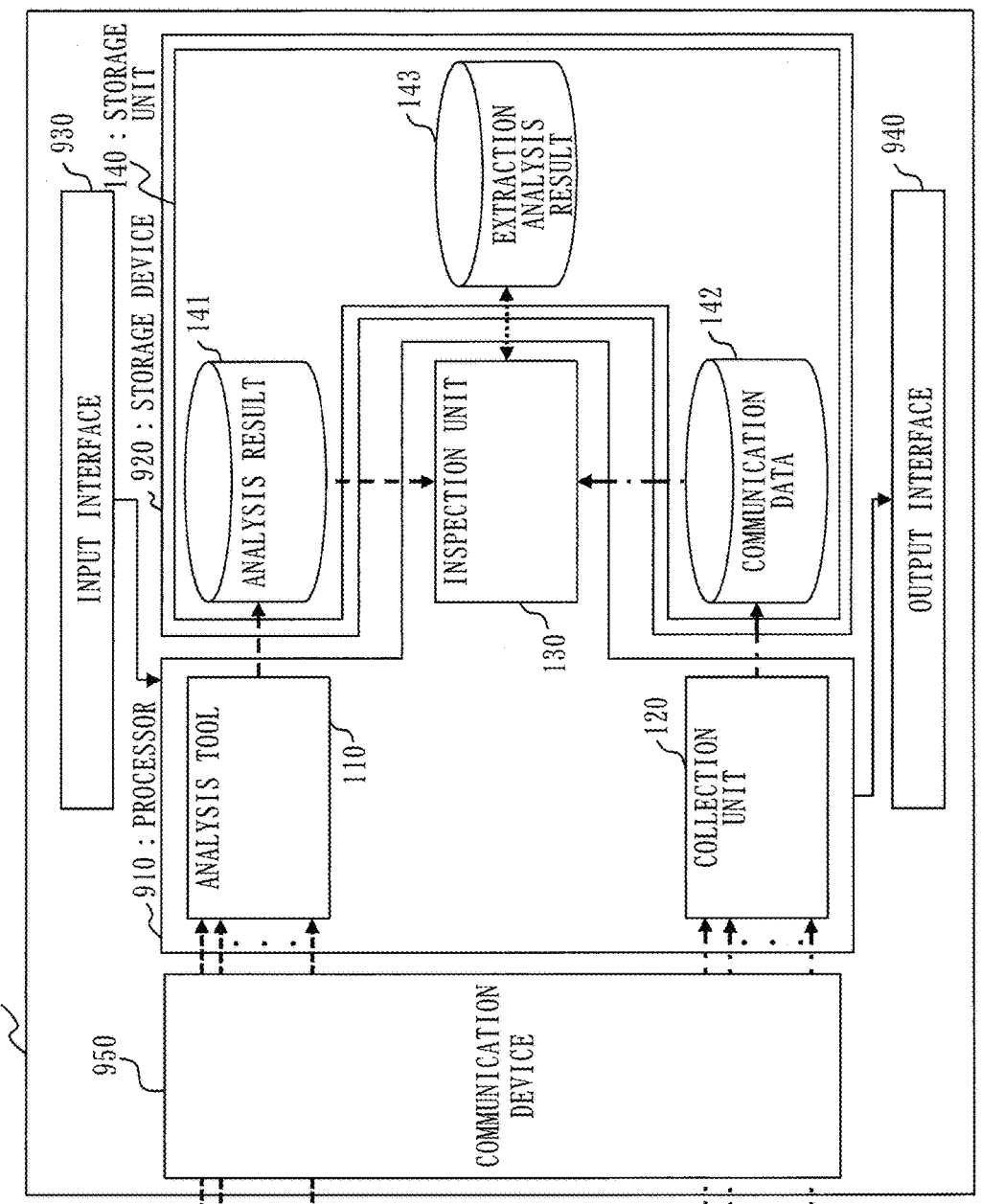
FIG. 1 is a configuration diagram of a program analysis system 500 and a program analysis device 100 according to a first embodiment.

Hereinafter, an embodiment of the present invention will be described by using diagrams. Note that, in each diagram, same parts or corresponding parts are denoted by same signs. In the explanation of the embodiment, description of the same parts or the corresponding parts will be omitted or simplified as needed.

First Embodiment

Explanation of Configuration

By using FIG. 1, configurations of a program analysis system 500 and a program analysis device 100 according to the present embodiment will be described.

The program analysis system 500 includes a plurality of execution devices that respectively execute programs, and the program analysis device 100 to analyze the programs respectively executed by each of the plurality of execution devices. The plurality of execution devices include a first execution device 201 to execute a first program 211, a second execution device 202 to execute a second program 212, and an n-th execution device 20n to execute an n-th program 21n. Note that n is a natural number. The program analysis system 500 analyzes a program 21 including the first program 211 and the second program 212.

All of or at least a part of the first program 211, the second program 212 and the n-th program 21n may be simply called the program 21. Further, all or at least a part of the first execution device 201, the second execution device 202 and the n-th execution device 20n may be simply called an execution device 20.

Each of the plurality of execution devices belongs to mutually-independent domains. In the program analysis system 500, each of the plurality of execution devices executes programs concurrently while performing inter-domain communication. That is, in the program analysis system 500, the first execution device 201 and the second execution device 202 execute the first program 211 and the second program 212 concurrently while communicating with each other.

In the present embodiment, the first program 211 includes a transmission function to transmit values to the second program 212. Further, the second program 212 includes a reception function to receive values from the first program 211. The first program 211 transmits a value of an argument to the second program 212. Further, the second program 212 receives a return value or an argument from the first program 211. The transmission function and the reception function are also called communication functions.

As illustrated in FIG. 1, the program analysis device 100 is a computer.

The program analysis device 100 is equipped with hardware components such as a processor 910, a storage device 920, an input interface 930, an output interface 940 and a communication device 950. The storage device 920 includes a memory and an auxiliary storage device.

The program analysis device 100 is equipped with, as functional components, an analysis tool 100, a collection unit 120, an inspection unit 130 and a storage unit 140. The inspection unit 130 is equipped with a judgment unit 131, an extraction unit 132 and a determination unit 133. The storage unit 140 stores an analysis result 141, communication data 142 and an extraction analysis result 143.

The functions of the analysis tool 110, the collection unit 120, the judgment unit 131, the extraction unit 132 and the determination unit 133 are realized by software.

The storage unit 140 is realized by the memory and the auxiliary storage device. Further, the storage unit 140 may be realized only by the memory, or only by the auxiliary storage device. The realization method of the storage unit 140 is arbitrary. In the present embodiment, the analysis result 141, the communication data 142 and the extraction analysis result 143 are stored in the memory.

The processor 910 is connected to other hardware components via a signal line to control the other hardware components. The processor 910 is an integrated circuit (IC) to perform arithmetic processing. The processor 910 is an integrated circuit (IC) to perform arithmetic processing. The processor 910 is a central processing unit (CPU) or a micro-processing unit (MPU).

The auxiliary storage device is, specifically, a read only memory (ROM), a flash memory, or a hard disk drive (HDD). The memory is, specifically, a random access memory (RAM).

The input interface 930 is a port whereto an input device such as a mouse, a keyboard, or a touch panel is connected. The input interface 930 is, specifically, a universal serial bus (USB) terminal. The input interface 930 may be a port whereto a local area network (LAN) is connected.

The output interface 940 is a port whereto a cable of a display apparatus such as a display device is connected. The output interface 940 is, specifically, a USB terminal or a high definition multimedia interface (HDMI) (registered trademark) terminal. The display device is, specifically, a liquid crystal display (LCD).

The communication device 950 is equipped with a receiver and a transmitter. Specifically, the communication device is a communication chip or a network interface card (NIC). The communication device is a communication unit to communicate data. The receiver is a receiving unit to receive data. The transmitter is a transmitting unit to transmit data.

The auxiliary storage device stores a program to realize the functions of the analysis tool 110, the collection unit 120, the judgment unit 131, the extraction unit 132 and the determination unit 133. The program to realize the functions of the analysis tool 110, the collection unit 120, the judgment unit 131, the extraction unit 132 and the determination unit 133 is also called an analysis program 520. The program is loaded into the memory, read into the processor 910, and executed by the processor 910. Further, the auxiliary storage device stores an operating system (OS). At least a part of the OS is loaded into the memory. The processor 910 executes the analysis program 520 while executing the OS.

The program analysis device 100 may be equipped with only one processor 910, or may be equipped with a plurality of processors 910. The plurality of processors 910 may cooperatively execute the program to realize the functions of the analysis tool 110, the collection unit 120, the judgment unit 131, the extraction unit 132 and the determination unit 133.

The information, data, signal values and variable values indicating results of the processing by the analysis tool 110, the collection unit 120, the judgment unit 131, the extraction unit 132 and the determination unit 133 are stored in the auxiliary storage device, the memory, or a register or a cache memory in the processor 910 of the program analysis device 100.

The program to realize the functions of the analysis tool 110, the collection unit 120, the judgment unit 131, the extraction unit 132 and the determination unit 133 may be stored in a portable recording medium. The portable recording medium is, specifically, a magnetic disk, a flexible disk, an optical disc, a compact disk, a blue-ray (registered trademark) disc, a digital versatile disc (DVD).

Note that what is called an analysis program product is a storage medium and a storage device wherein the analysis program 520 is recorded. The analysis program product is a program product into which a computer-readable program is loaded, irrespective of the form as it appears.

Explanation of Functional Component

Next, each functional component of the program analysis device 100 in FIG. 1 will be described.

The analysis tool 110 acquires the source code 210 of the program 21 executed concurrently by the plurality of execution devices, and performs an analysis on the source code 210 acquired. The analysis tool 110 stores the execution result of the analysis as an analysis result 141 in the storage unit 140. The analysis tool 110 is a static analysis tool, in particular. Further, the analysis result 141 is a static analysis result, in particular.

The collection unit 120 collects individual communication data 220 communicated between programs from the program 21, and store the individual communication data 220 in the storage unit 140 as communication data 142.

Specifically, the collection unit 120 collects the individual communication data 220 representing communication performed by the execution device 20 according to the communication functions included in the program 21. The collection unit 120 collects, as the individual communication data 220, transmission information 251 representing communication performed by the first execution device 201 according to transmission function 511, and reception information 252 representing communication performed by the second execution device 202 according to the reception function 512.

The inspection unit 130 inspects whether a warning falsely detected exists in warnings included in the analysis result 141 obtained by analyzing each source code 210 of the first program 211 and the second program 212 by the analysis tool 110, by using the transmission information 251 and the reception information 252 collected by the collection unit 120. In particular, the inspection unit 130 reads out the analysis result 141 and the communication data 142 from the storage unit 140. The communication data 142 includes the transmission information 251 and the reception information 252 as the individual communication data 220. The inspection unit 130 analyzes the analysis result 141 and the communication data 142, and removes a falsely-detected warning 451 in the warnings included in the analysis result 141. The inspection unit 130 stores the analysis result 141 from which the warning falsely detected is removed in the storage unit 140 as the extraction analysis result 143.

Figure 2:
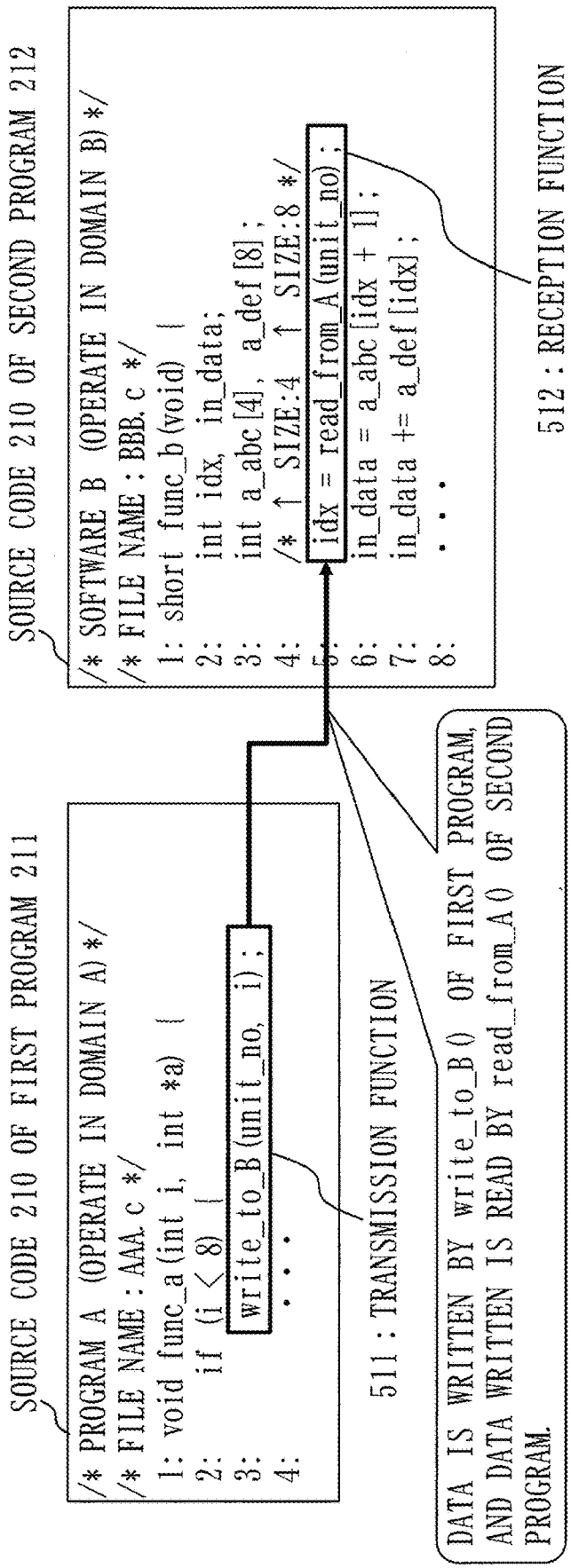
FIG. 2 is a diagram illustrating an example of a source code 210 of a program 21 according to the first embodiment.

By using FIG. 2, an example of the source code 210 of the program 21 according to the present embodiment will be described. FIG. 2 is an example of each source code 210 of the first program 211 and the second program 212.

As for the first program 211, it is presented an example of the transmission function 511 to transmit a value of an argument to the second program 212 by write_to_B (unit_no, i). As for the second program 212, it is presented an example of the reception function 512 to receive a return value from the first program 211 by idx=read_from_A (unit_no). In the example of the reception function 512, it is presented an example wherein the return value is received; however, there is a case wherein an argument is received.

Figure 3:
FIG. 3 is a configuration diagram of communication data 142 according to the first embodiment.

FIG. 3 is a diagram illustrating a configuration of the communication data 142 according to the present embodiment.

Figure 4:
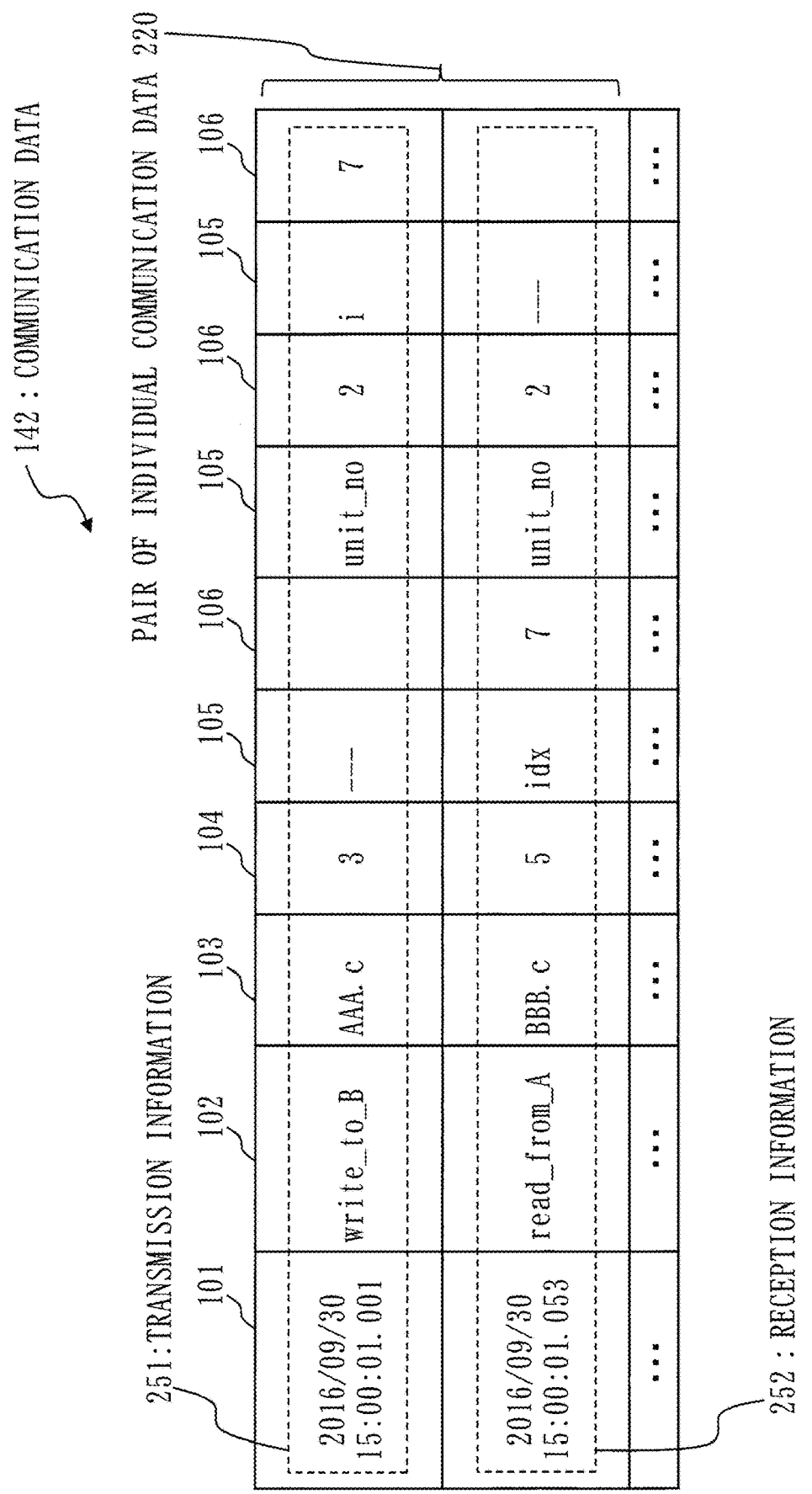
FIG. 4 is a diagram illustrating an example of the communication data 142 representing communication between a first program 211 and a second program 212 illustrated in FIG. 2.

Further, FIG. 4 is an example of the communication data 142 representing communication between the first program 211 and the second program 212 illustrated in FIG. 2.

As illustrated in FIG. 3, the communication data 142 includes items such as a communication time 101, a function name 102, a source file name 103, a line number 104, and a data pair 56 of a name 105 and a value 106 of a variable. The communication time 101 is a clock time when communication is performed by the execution device 20. The function name 102 is a name of a communication function that has performed communication. The source file name 103 is a file name of a source code whereby the communication function is called. The line number 104 is a line number of the communication function in the source file of the file name 103. A name 105 and a value 106 of a variable are paired as a data pair 56. A name 105 of a return value is a variable name of a return value of a communication function. A name 105 of a return value and a value 106 of the return value form a data pair 56. Further, a name 105 of an argument 1 and a value 106 of the argument 1 form a data pair 56. In addition, a name 105 of an argument 2 and a value 106 of the argument 2 form a data pair 56. Data pairs 56 of arguments are recorded in succession for the number of the arguments.

The first line of the communication data 142 in FIG. 4 is an example of the transmission information 251 representing communication performed according to the transmission function 511 by the first execution device 201 to execute the first program 211 in FIG. 2. The second line of the communication data 142 in FIG. 4 is an example of the reception information 252 representing communication performed according to the reception function 512 by the second execution device 202 to execute the second program 212 in FIG. 2.

The transmission information 251 includes the communication time 101 when the first execution device 201 performs communication and the function name 102 of the transmission function 511. Further, the transmission information 251 includes the line number 104 of the transmission function 511 in the source code 210 of the first program 211. Furthermore, the transmission information 251 includes the name 105 of the argument used in the transmission function 511 and the value 106 set to the argument.

The reception information 252 includes the communication time 101 when the second execution device 202 performs communication, and the function name 102 of the reception function 512. Further, the reception information 252 includes the line number 104 of the reception function 512 in the source code 210 of the second program 212. Furthermore, the reception information 252 includes names 105 respectively of the return value and the argument used in the reception function 512, and values 106 respectively set to the return value and the argument.

Explanation of Operation

Figure 5:
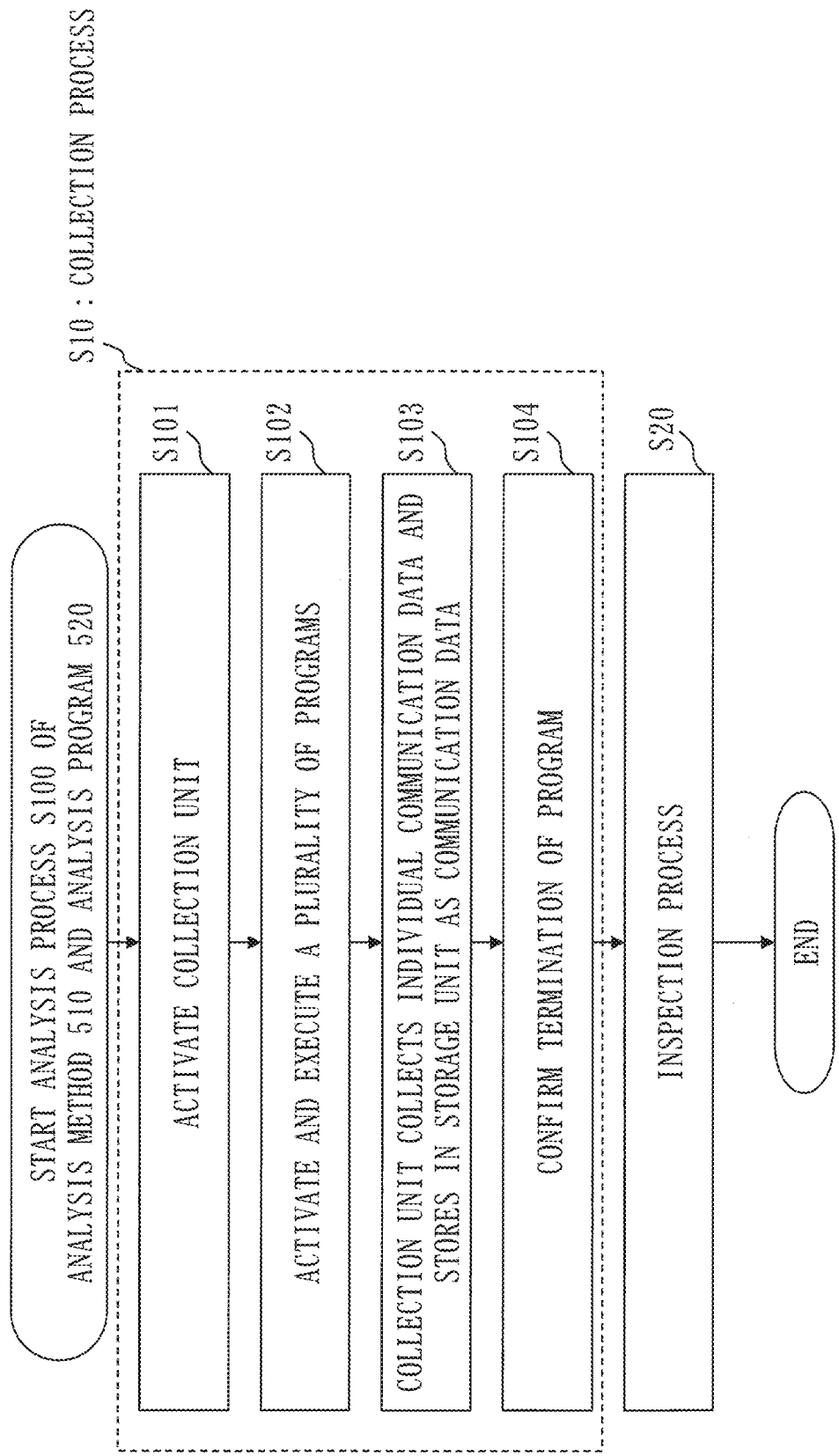
FIG. 5 is a flowchart illustrating a program analysis process S100 of a program analysis method 510 and of an analysis program 520 of the program analysis device 100 according to the first embodiment.

FIG. 5 is a flowchart indicating a program analysis process S100 of a program analysis method 510 and the analysis program 520 of the program analysis device 100 according to the present embodiment. The analysis program 520 makes the program analysis device 100 being a computer perform each process as described below.

As a premise, the analysis result 141 is assumed to have been generated. That is, the analysis tool 110 analyzes the source code 210 of the program 21, and stores the analysis result 141 obtained by the analysis in the storage unit 140.

Figure 6:
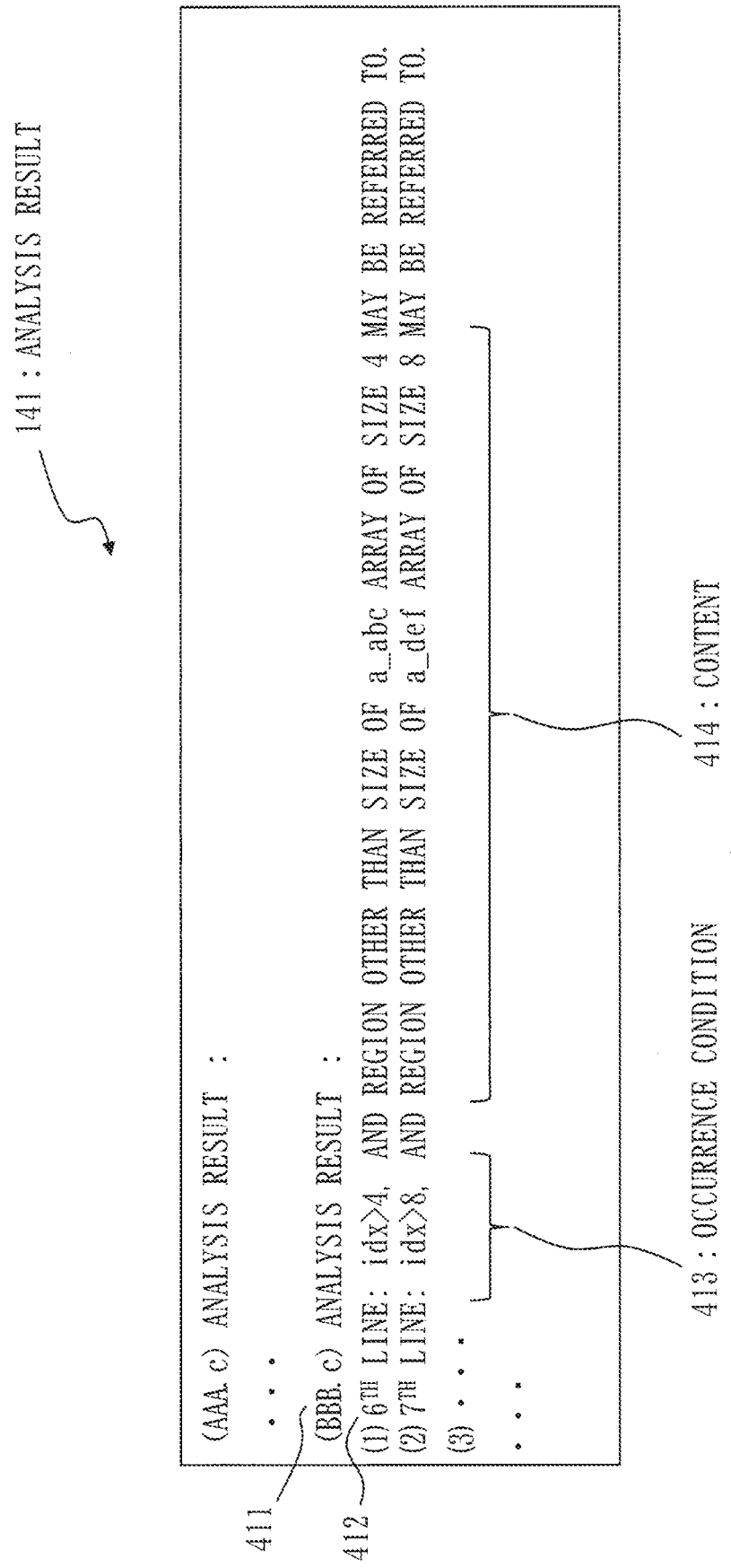
FIG. 6 is a diagram illustrating an example of an analysis result 141 of each source code 210 of the first program 211 and the second program 212 illustrated in FIG. 2.

FIG. 6 is a diagram illustrating an example of the analysis result 141 of the source codes 210 respectively of the first program 211 and the second program 212 illustrated in FIG. 2. As illustrated in FIG. 6, the analysis result 141 includes file names 411 of source codes being analysis objects, and number of lines 412 for which warnings are detected in the source codes being the analysis objects. Furthermore, the analysis result 141 includes information on an occurrence condition 413 for which a warning is generated, and contents 414 of the warning.

Further, as a premise, the mechanism to transmit individual communication data 220 from the execution device 20 to the collection unit 120 is assumed to have been inserted in the source code 210 of the program 21. The program 21 incorporating the mechanism is generated as an executable load module.

<Collection Process S10>

In a step S101, the collection unit 120 is activated. Specifically, a user inputs an activation request of the collection unit 120 to the program analysis device 100 via the input interface 930. By the activation request being input in the program analysis device 100, the collection unit 120 is activated.

In a step S102, a plurality of programs 21 are activated. Specifically, a user inputs a program execution request in the program analysis device 100 via the input interface 930. When the program execution request is input in the program analysis device 100, the program analysis device 100 transmits program execution orders to order execution of the programs 21 respectively to the plurality of execution devices 20 via the communication device 950. The execution devices 20 execute the programs 21 when the program execution orders are received.

In a step S103, the collection unit 120 collects transmission information 251 representing communication performed by the first execution device 201 in accordance with the transmission function 511, and reception information 252 representing communication performed by the second execution device 202 in accordance with the reception function 512. Specifically, the collection unit 120 collects the individual communication data 220 transmitted from each execution device 20, and stores the individual communication data 220 in the storage unit 140 as the communication data 142. The individual communication data 220 include the transmission information 251 and the reception information 252.

In a step S104, the program analysis device 100 confirms termination of execution of each program 21. Specifically, the program analysis device 100 receives termination confirmation of the programs 21 from each execution device 20 via the communication device 950. Otherwise, the program analysis device 100 inputs an order of forced termination of the programs 21 via the input interface 930 from a user.

<Inspection Process S20>

Next, the program analysis device 100 executes an inspection process S20 by the inspection unit 130.

In the inspection process S20, the inspection unit 130 inspects whether a warning falsely detected exists in warnings included in the analysis result 141 being a result of analysis taking the first program 211 and the second program 212 as objects, by using the transmission information 251 and the reception information 252 collected by the collection unit 120. The analysis result 141 is obtained by analyzing each source code 210 of the first program 211 and the second program 212 by the analysis tool 110. In the collection process S20, it is presented an example wherein a return value is received by the reception function 512; however, there is a case wherein an argument is received. In this case, the process is executed by replacing the return value with the argument.

Figure 7:
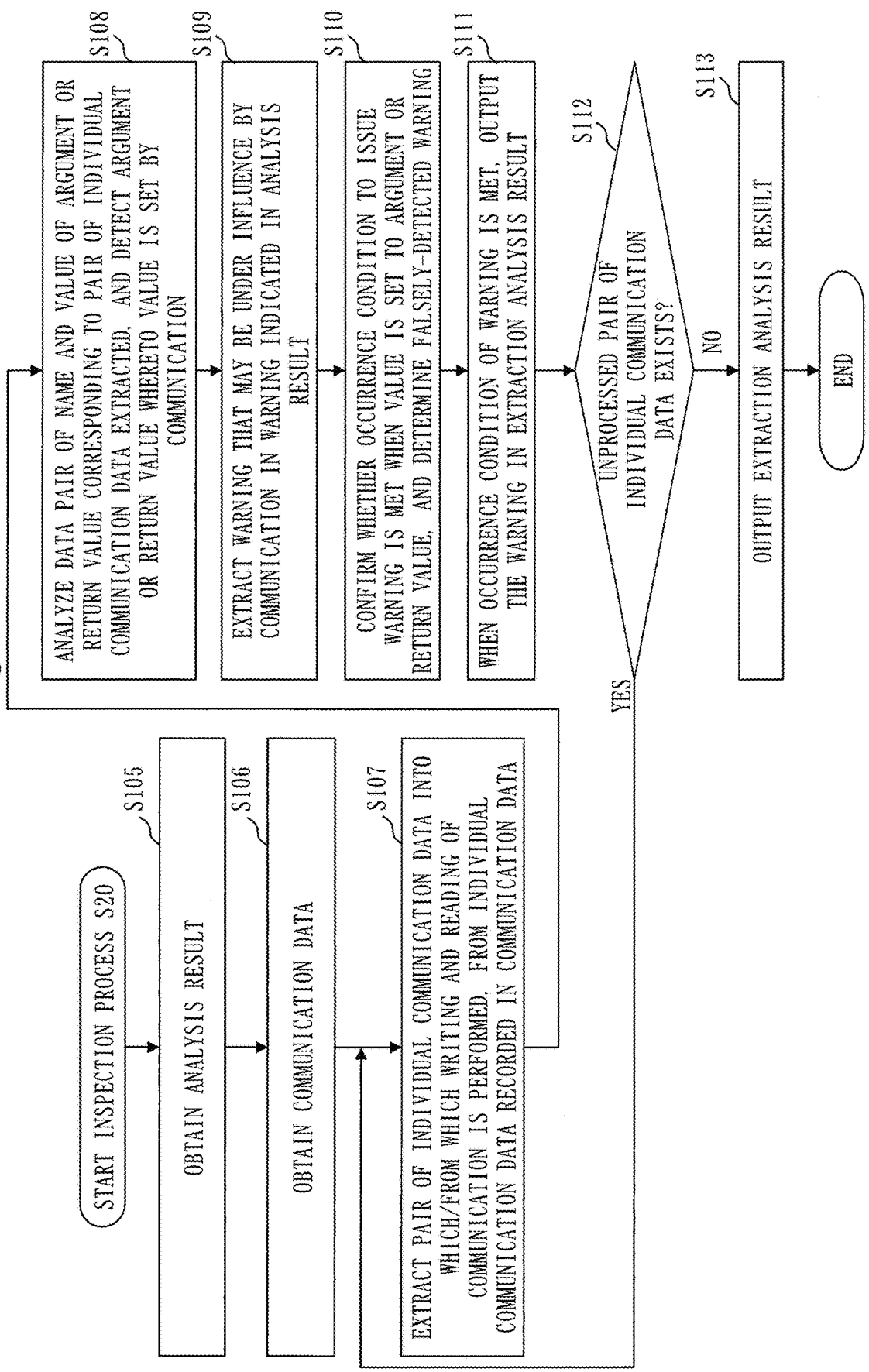
FIG. 7 is a flowchart illustrating an inspection process S20 according to the first embodiment.

FIG. 7 is a flowchart illustrating the inspection process S20 according to the present embodiment.

In a step S105, the inspection unit 130 acquires the analysis result 141 from the storage unit 140. The inspection unit 130 may acquire the analysis result 141 by an acquisition order of the analysis result 141 input by a user via the input interface 930.

In a step S106, the inspection unit 130 acquires the communication data 142 from the storage unit 140. The inspection unit 130 may acquire the communication data 142 by an acquisition order of the communication data 142 input by a user via the input interface 930.

In a step S107, the judgment unit 131 of the inspection unit 130 compares a communication time 101 included in the transmission information 251 with a communication time 101 included in the reception information 252. Further, the judgment unit 131 compares a function name 102 of the transmission function 511 included in the transmission information 251 with a function name 102 of the reception function 512 included in the reception information 252. Furthermore, the judgment unit 131 compares a name 105 and a value 106 of the argument used in the transmission function 511 included in the transmission information 251 with a name 105 and a value 106 of the return value used in the reception function 512 included in the reception information 252. Based on the result of comparison, the judgment unit 131 judges whether the transmission function 511 and the reception function 512 are corresponding functions. The case wherein the transmission function 511 and the reception function 512 are the corresponding functions means, in particular, a case wherein the transmission function 511 is a write function and the reception function 512 is a read function.

The judgment unit 131 extracts a pair of individual communication data 220 into which and from which writing and reading of communication has been performed, from the individual communication data 220 recorded in the communication data 142. The judgment unit 131 extracts the pair of the individual communication data 220 into which and from which writing and reading of communication has been performed, from the individual communication data 220 recorded in the communication data 142 based on the communication time 101, the function name 102, the name 105 and the value 106 of the argument or the return value.

In a step S108, the judgment unit 131 analyzes a data pair of names 105 and values 106 of arguments or return values corresponding to the pair of the individual communication data 220 extracted, and detects an argument or a return value for which values are set by communication.

Specifically, in the communication data 142 of FIG. 4, the judgment unit 131 extracts the individual communication data 220 in the first line and the individual communication data 220 in the second line as a pair of individual communication data 220 into which and from which writing and reading of communication has been performed. Then, the judgment unit 131 analyzes each data pair of the individual communication data 220 in the first line and the individual communication data 220 in the second line, and detects (A) and (B) as follows.

(A) i==7 of an argument 2 in write_to_B (unit_no, i) is set to a return value idx in idx=read_from_A (unit_no)
(B) unit_no==2 of an argument 1 in write_to_B (unit_no, i) is set to unit_no==2 of an argument 1 in idx=read_from_A (unit_no).

In a step S109, the extraction unit 132 of the inspection unit 130 extracts a warning under an influence imp of communication represented by the transmission information 251 and communication represented by the reception information 252 from warnings included in the analysis result 141 when the transmission function 511 and the reception function 512 are corresponding functions. Specifically, the extraction unit 132 extracts a warning that may be under the influence imp of communication among warnings indicated in the analysis result 141, based on the pair of the individual communication data 220 extracted. The extraction unit 132 extracts a warning under the influence imp from the warnings included in the analysis result 141 by using the line number 104 of the transmission function 511 and the line number 104 of the reception function 512. Specifically, the extraction unit 132 extracts a warning that may be under the influence imp of communication based on the file name 103 and the line number 104 included in the pair of the individual communication data 220, and the file name 411 and the number of lines 412 included in the analysis result 141.

Specifically, in the pair of the individual communication data 220 illustrated in FIG. 4, idx in the fifth line is a return value by communication in the source code of the file name BBB.c illustrated in FIG. 2. Further, in the analysis result 141 illustrated in FIG. 6, warnings having idx as a condition are indicated in the sixth and the seventh lines of the source code of the file name BBB.c. Thus, the warnings in the sixth and the seventh lines are extracted as warnings that may be under the influence imp by communication. Note that in the source code of the file name BBB.c, the warning indicated in the sixth line is a warning 1, and the warning indicated in the seventh line is a warning 2.

In a step S110, the determination unit 133 judges whether a condition to issue a warning is met or not with respect to the warnings extracted by the extraction unit 132 based on each source code 210 of the first program 211 and the second program 212, the transmission information 251 and the reception information 252. The determination unit 133 determines a warning for which the condition is not met as a falsely detected warning. The determination unit 133 judges whether the condition to issue a warning is met with respect to the warnings extracted by the extraction unit 132 by using each source code 210 of the first program 211 and the second program 212, the name 105 and the value 106 of the argument used in the transmission function 511, and the name 105 and the value 106 of the return value used in the reception function 512. Specifically, the determination unit 133 detects a warning for which the argument or the return value detected in the step S108 is an occurrence condition to issue the warning among the warnings extracted as warnings that may be under the influence imp by communication. Then, the determination unit 133 confirms whether the occurrence condition to issue the warning is met or not when a value is set to the argument or the return value.

A concrete example of the inspection process S20 according to the present embodiment will be described by using FIG. 8.

As illustrated in FIG. 8, the inspection unit 130 detects that i==7 of the argument 2 in write_to_B (unit_no, i) is set to the return value idx of idx=read_from_A (unit_no), from the pair of the individual communication data 220 of the communication data 142. Further, the inspection unit 130 detects that unit_no==2 of the argument 1 in write_to_B (unit_no, i) is set to unit_no==2 of the argument 1 in idx=read_from_A (unit_no).

The warning 1 is "idx>4, and a region other than the size of a_abc array of size 4 may be referred to." The occurrence condition of the warning 1 is idx>4. Since the value of the return value idx is 7, there is a possibility of idx>4. Thus, as for the warning 1, the occurrence condition is met.

Meanwhile, the warning 2 is "idx>8, and a region other than the size of a_def array of size 8 may be referred to." The occurrence condition of the warning 2 is idx>8. Since the value of the return value idx is 7, there is no possibility of idx>8. Thus, as for the warning 2, the occurrence condition is not met.

Therefore, the inspection unit 130 determines the warning 2 as the falsely-detected warning 451.

In a step S111, the inspection unit 130 writes a warning for which an occurrence condition is met in the extraction analysis result 143. The inspection unit 130 does not write a warning for which an occurrence condition is not met in the extraction analysis result 143.

In a step S112, the inspection unit 130 judges whether a pair of individual communication data 220 that has not been processed exists in pairs of individual communication data 220 extracted from the communication data 142. When the pair of individual communication data 220 that has not been processed exists, the inspection unit 130 returns to the step S107, and performs the processes from the step S107 through the step S111 for the pair of individual communication data 220 that has not been processed. When there is no pair of individual communication data 220 that has not been processed, the inspection unit 130 proceeds to a step S113.

In a step S113, the inspection unit 130 outputs an extraction analysis result 143 to an output device such as a display via the output interface 940.

The explanation of the program analysis process S100 according to the present embodiment finishes as described above.

Other Configuration

In the present embodiment, the configurations or the contents illustrated in FIG. 2, FIG. 4, FIG. 6 and FIG. 8 are examples, and information included in analysis results may have different configurations and different contents depending on analysis tools used. Further, in the present embodiment, the form of the communication function to perform communication called by the program 21 and the collection method of data are examples. The type, number, and form of data collected as the individual communication data may be different type, number and form depending on a communication function and a collection method of data. That is, as for the information illustrated as examples in FIG. 4, FIG. 6 and FIG. 8 based on FIG. 2, different forms may be used if the information can be organized appropriately.

Furthermore, in FIG. 1 of the present embodiment, the source code 210 is obtained via the communication device 950, whereas the source code 210 may be obtained in other methods. For example, the source code 210 may be obtained via the input interface 930. If only it is possible for the program analysis device 100 to obtain the source code 210, the source code 210 may be obtained in any other manners.

In the present embodiment, the functions of the analysis tool 110, the collection unit 120, the judgment unit 131, the extraction unit 132 and the determination unit 133 are realized by software. However, as a variation, the functions of the analysis tool 110, the collection unit 120, the judgment unit 131, the extraction unit 132 and the determination unit 133 may be realized by hardware components.

By using FIG. 9, a configuration of the program analysis device 100 according to a variation of the present embodiment will be described.

Figure 9:
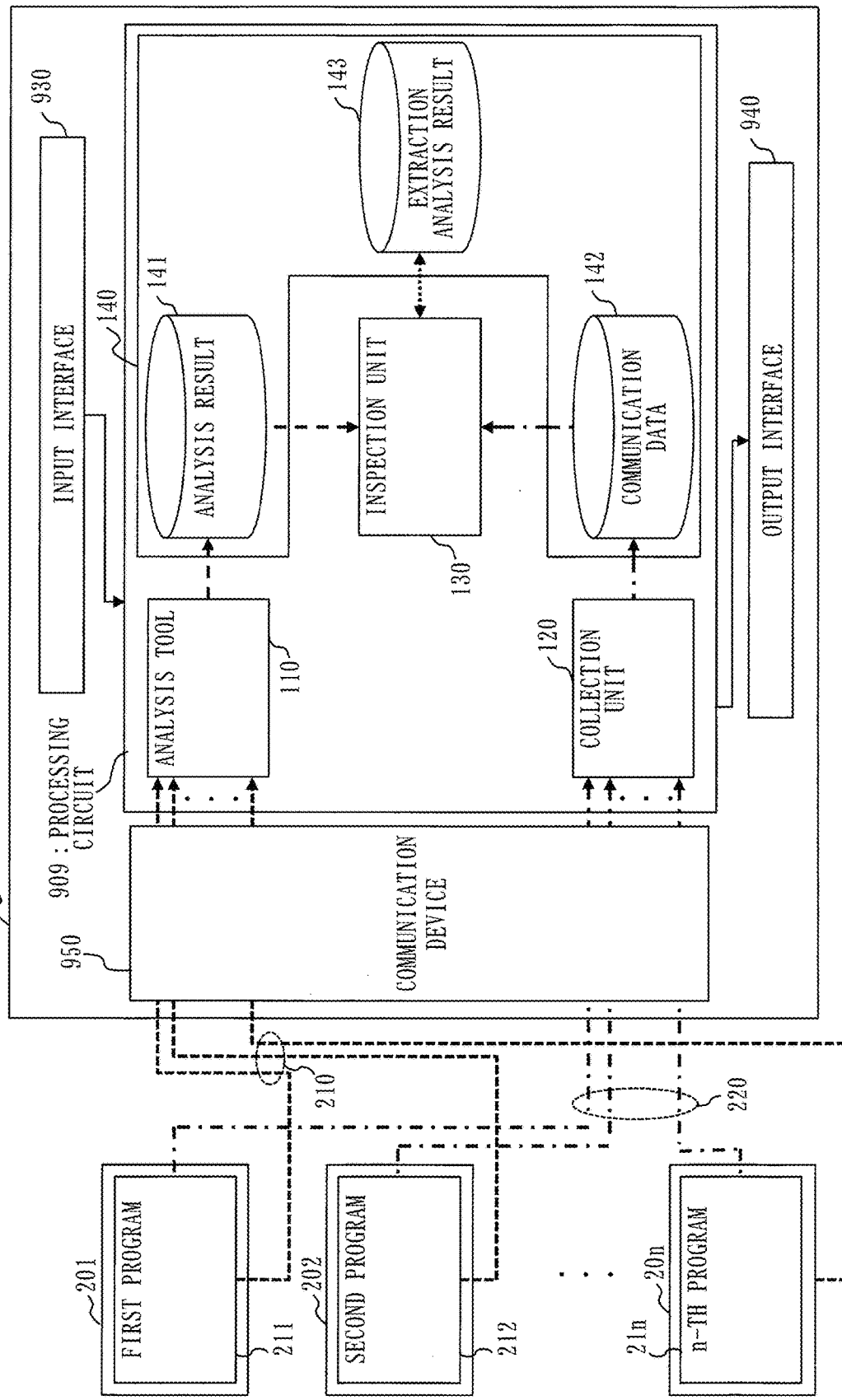
FIG. 9 is a configuration diagram of the program analysis device 100 according to a variation of the first embodiment.

As illustrated in FIG. 9, the program analysis device 100 includes hardware components such as a processing circuit 909, an input interface 930, an output interface 940 and a communication device 950.

The processing circuit 909 is a dedicated electronic circuit to realize the functions of the analysis tool 110, the collection unit 120, the judgment unit 131, the extraction unit 132 and the determination unit 133, and the storage unit 140, as described above. The processing circuit 909 is, specifically, a single circuit, a combined circuit, a processor made into a program, a processor made into a parallel program, a logic integrated circuit (logic IC), a GA, an ASIC or an FPGA. "GA" is an abbreviation for "gate array." "ASIC" is an abbreviation for "application specific integrated circuit." "FPGA" is an abbreviation for "field-programmable gate array."

The functions of the analysis tool 110, the collection unit 120, the judgment unit 131, the extraction unit 132 and the determination unit 133 may be realized by one processing circuit 909, or may be realized by a plurality of processing circuits 909 in a distributed manner.

As another variation, the functions of the program analysis device 100 may be realized by a combination of software and hardware. That is, a part of the functions of the program analysis device 100 may be realized by dedicated hardware components, and the rest of the functions may be realized by software.

The processor 910, the storage device 920 and the processing circuit 909 of the program analysis device 100 are collectively referred to as "processing circuitry." That is, regardless of whichever configuration illustrated in FIG. 1 and FIG. 9 the configuration of the program analysis device 100 may be, the functions of the analysis tool 110, the collection unit 120, the judgment unit 131, the extraction unit 132 and the determination unit 133 and the storage unit 140 are realized by the processing circuitry.

"Unit" may be replaced with "step," "procedure," or "process." Further, the functions of "unit" may be realized by firmware.

Explanation of Effect of Embodiment

According to a program analysis system 500 according to the present embodiment, it is possible to remove a warning falsely detected due to an assumption of an impossible condition in an actual operation by the analysis tool, i.e., a false-recognition warning. Thus, by the program analysis system 500 according to the present embodiment, the number of warnings of analysis results to be confirmed is reduced, a detection hit ratio of defect in analysis is improved, and mounting quality is effectively ensured.

In the program analysis system 500 according to the present embodiment, with respect to source codes constituting programs to execute processing in a cooperative manner by communication between the programs, source codes of programs executed in one domain are analysis objects. By the program analysis system 500 according to the present embodiment, it is possible to prevent a warning which is clear to be impossible in an actual operation by taking information of inter-domain communication into consideration, i.e., a falsely-detected warning, from being output as a warning.

In the present embodiment, the program analysis device 100 is configured by taking each of the analysis tool 110, the collection unit 120, the judgment unit 131, the extraction unit 132 and the determination unit 133 as an independent functional block. However, the configuration needs not necessarily be what described in the present embodiment above, and the configuration of the program analysis device 100 is arbitrary. The configurations of the functional blocks in the program analysis device 100 are arbitrary only if it is possible for them to realize the functions described in the embodiment described above. The program analysis device 100 may be configured by any other combinations of those functional blocks, or may be an arbitrary block configuration.

Furthermore, the program analysis device 100 may be configured by one apparatus, or a plurality of apparatuses.

While the first embodiment has been described, the embodiment may be performed by combining a plurality of parts of the embodiment. Meanwhile, one part of the embodiment may be performed. Otherwise, a plurality of parts of the embodiment may be performed as a whole, or may be performed in any combination of parts.

The embodiment as described above is only an essentially preferred example, and is not aimed at limiting the present invention, its application and its range of use, whereto various alterations can be made as needed.

REFERENCE SIGNS LIST

100: program analysis device; 110: analysis tool; 120: collection unit; 130: inspection unit; 131: judgment unit; 132: extraction unit; 133: determination unit; 140: storage unit; 141: analysis result; 142: communication data; 143: extraction analysis result; 20: execution device; 201: first execution device; 202: second execution device; 20n: n-th execution device; 21: program; 211: first program; 212: second program; 21n: n-th program; 210: source code; 220: individual communication data; 251: transmission information; 252: reception information; 511: transmission function; 512: reception function; 56: data pair; 101: communication time; 102: function name; 103: file name; 104: line number; 105: name; 106: value; 411: file name; 412: number of lines; 413: occurrence condition; 414: content; 451: falsely-detected warning; 500: program analysis system; 510: program analysis method; 520: analysis program; S100: program analysis process; S10: collection process; S20: inspection process; 909: processing circuit; 910: processor; 920: storage device; 930: input interface; 940: output interface; 950: communication device; idx: return value; i: argument; imp: influence

The invention claimed is:

1. A program analysis device to analyze a first program executed by a first execution device, and a second program executed concurrently with the first program by a second execution device that communicates with the first execution device, wherein the first execution device is physically separate from the second execution device, wherein the first program includes a transmission function to transmit a value to the second program, and the second program includes a reception function to receive a value from the first program,
the program analysis device comprising:
processing circuitry configured to:
collect transmission information representing communication performed by the first execution device in accordance with the transmission function, and reception information representing communication performed by the second execution device in accordance with the reception function, and inspect, by using the collected transmission information and the collected reception information, whether a falsely-detected warning exists in a warning included in an analysis result obtained by analyzing each source code of the first program and the second program by an analysis tool by:

compares a communication time when the first execution device performs communication included in the transmission information with a communication time when the second execution device performs communication included in the reception information, compares a function name of the transmission function included in the transmission information with a function name of the reception function included in the reception information, and judges whether the transmission function and the reception function are corresponding functions, extracts, when the transmission function and the reception function are the corresponding functions, a warning under an influence of the communication represented by the transmission information and the communication represented by the reception information, from the warning included in the analysis result, and judges whether an occurrence condition to issue a warning is met with respect to the extracted warning, based on each source code of the first program and the second program, the transmission information and the reception information, and determines a warning for which the occurrence condition is not met as the falsely-detected warning.

2. The program analysis device as defined in claim 1, wherein the processing circuitry collects the transmission information including the communication time when the first execution device performs communication, and the function name of the transmission function, and the reception information including the communication time when the second execution device performs communication, and the function name of the reception function.

3. The program analysis device as defined in claim 1, wherein the processing circuitry collects the transmission information including a line number of the transmission function in the source code of the first program, and the reception information including a line number of the reception function in the source code of the second program, and extracts the warning under the influence from the warning included in the analysis result, by using the line number of the transmission function and the line number of the reception function.

4. The program analysis device as defined in claim 3, wherein the transmission function transmits a value of an argument to the second program, the reception function receives a value of a return value or an argument from the first program, and the processing circuitry collects the transmission information including a name of the argument used in the transmission function and a value set to the argument, and the reception information including a name of the return value or the argument used in the reception function, and a value set to the return value or the argument, and judges whether the occurrence condition is met with respect to the extracted warning, by using each source code of the first program and the second program, the name of the argument used in the transmission function, the value set to the argument, the name of the return value or the argument used in the reception function, and the value set to the return value or the argument.

5. The program analysis device as defined in claim 1, wherein the transmission function transmits a value of an argument to the second program, the reception function receives a value of a return value or an argument from the first program, and the processing circuitry collects the transmission information including a name of the argument used in the transmission function and a value set to the argument, and the reception information including a name of the return value or the argument used in the reception function, and a value set to the return value or the argument, and judges whether the occurrence condition is met with respect to the extracted warning, by using each source code of the first program and the second program, the name of the argument used in the transmission function, the value set to the argument, the name of the return value or the argument used in the reception function, and the value set to the return value or the argument.

6. A program analysis system comprising a first execution device to execute a first program, a second execution device to execute a second program, and a program analysis device to analyze the first program and the second program, wherein the first execution device is physically separate from the second execution device, wherein the first program includes a transmission function to transmit a value to the second program, the second program includes a reception function to receive a value from the first program, and the first execution device and the second execution device execute the first program and the second program concurrently while communicating with each other, and wherein the program analysis device includes processing circuitry configured to:

collect transmission information representing communication performed by the first execution device in accordance with the transmission function, and reception information representing communication performed by the second execution device in accordance with the reception function, and inspect, by using the collected transmission information and the collected reception information, whether a falsely-detected warning exists in a warning included in an analysis result obtained by analyzing each source code of the first program and the second program by an analysis tool by:

compare a communication time when the first execution device performs communication included in the transmission information with a communication time when the second execution device performs communication included in the reception information, compare a function name of the transmission function included in the transmission information with a function name of the reception function included in the reception information, and judge whether the transmission function and the reception function are corresponding functions, extract, when the transmission function and the reception function are the corresponding functions, a warning under an influence of the communication represented by the transmission information and the communication represented by the reception information, from the warning included in the analysis result, and judge whether an occurrence condition to issue a warning is met with respect to the extracted warning, based on each source code of the first program and the second program, the transmission information and the reception information, and determine a warning for which the occurrence condition is not met as the falsely-detected warning.

7. A program analysis method of a program analysis system, the program analysis system including a first execution device to execute a first program, a second execution device to execute a second program, and a program analysis device to analyze the first program and the second program, wherein the first execution device is physically separate from the second execution device, wherein the first program includes a transmission function to transmit a value to the second program, and the second program includes a reception function to receive a value from the first program, and wherein the first execution device and the second execution device execute the first program and the second program concurrently while communicating with each other, the program analysis method comprising:

collecting transmission information representing communication performed by the first execution device in accordance with the transmission function, and reception information representing communication performed by the second execution device in accordance with the reception function, and inspecting, by using the collected transmission information and the collected reception information, whether a falsely-detected warning exists in a warning included in an analysis result obtained by analyzing each source code of the first program and the second program by an analysis tool by:

comparing a communication time when the first execution device performs communication included in the transmission information with a communication time when the second execution device performs communication included in the reception information, comparing a function name of the transmission function included in the transmission information with a function name of the reception function included in the reception information, and judging whether the transmission function and the reception function are corresponding functions, extracting, when the transmission function and the reception function are the corresponding functions, a warning under an influence of the communication represented by the transmission information and the communication represented by the reception information, from the warning included in the analysis result, and judging whether an occurrence condition to issue a warning is met with respect to the extracted warning, based on each source code of the first program and the second program, the transmission information and the reception information, and determining a warning for which the occurrence condition is not met as the falsely-detected warning.

8. A non-transitory computer readable medium comprising an analysis program of a program analysis system, the program analysis system including a first execution device to execute a first program, a second execution device to execute a second program, and a program analysis device to analyze the first program and the second program, wherein the first execution device is physically separate from the second execution device, wherein the first program includes a transmission function to transmit a value to the second program, and the second program includes a reception function to receive a value from the first program, and wherein the first execution device and the second execution device execute the first program and the second program concurrently while communicating with each other, the analysis program making the program analysis device being a computer execute:

a collection process to collect transmission information representing communication performed by the first execution device in accordance with the transmission function, and reception information representing communication performed by the second execution device in accordance with the reception function, and an inspection process to inspect, by using the transmission information and the reception information collected by the collection process, whether a falsely-detected warning exists in a warning included in an analysis result obtained by analyzing each source code of the first program and the second program by an analysis tool by:

a comparison process to compare a communication time when the first execution device performs communication included in the transmission information with a communication time when the second execution device performs communication included in the reception information, compare a function name of the transmission function included in the transmission information with a function name of the reception function included in the reception information, and judge whether the transmission function and the reception function are corresponding functions, an extraction process to extract, when the transmission function and the reception function are the corresponding functions, a warning under an influence of the communication represented by the transmission information and the communication represented by the reception information, from the warning included in the analysis result, and a judgement process to judge whether an occurrence condition to issue a warning is met with respect to the extracted warning, based on each source code of the first program and the second program, the transmission information and the reception information, and determine a warning for which the occurrence condition is not met as the falsely-detected warning.

* * * * *